(12) United States Patent
Sarraf

(10) Patent No.: US 11,111,004 B2
(45) Date of Patent: Sep. 7, 2021

(54) DEVICE AND METHOD FOR MOVABLY FASTENING A VEHICLE SYSTEM TO A PRIMARY STRUCTURE OF A VEHICLE

(71) Applicant: AIRBUS DEFENCE AND SPACE GMBH, Taufkirchen (DE)

(72) Inventor: Robert Cheikh Sarraf, Taufkirchen (DE)

(73) Assignee: Airbus Defence and Space GmbH, Taufkirchen (DE)

(*) Notice: Subject to any disclaimer, the term of this patent is extended or adjusted under 35 U.S.C. 154(b) by 217 days.

(21) Appl. No.: 16/555,221

(22) Filed: Aug. 29, 2019

(65) Prior Publication Data

US 2020/0130808 A1 Apr. 30, 2020

(30) Foreign Application Priority Data

Oct. 24, 2018 (DE) .......................... 102018126561.1

(51) Int. Cl.
*B64C 3/44* (2006.01)
*B64F 5/10* (2017.01)
*B64C 13/28* (2006.01)

(52) U.S. Cl.
CPC ................ *B64C 3/44* (2013.01); *B64C 13/28* (2013.01); *B64F 5/10* (2017.01)

(58) Field of Classification Search
CPC ..................................... B64C 3/44; B64C 3/48
See application file for complete search history.

(56) References Cited

U.S. PATENT DOCUMENTS

| 4,053,124 | A | * | 10/1977 | Cole | ............... | B64C 3/48 244/219 |
| 4,131,253 | A | | 12/1978 | Zapel | | |
| 4,351,502 | A | * | 9/1982 | Statkus | ............. | B64C 3/48 244/214 |
| 2010/0019096 | A1 | * | 1/2010 | Pecora | ............. | B64C 9/04 244/213 |

(Continued)

FOREIGN PATENT DOCUMENTS

| CN | 111086623 A | 5/2020 |
| DE | 10 2017 216 397 A1 | 3/2019 |

(Continued)

*Primary Examiner* — Richard G Davis
(74) *Attorney, Agent, or Firm* — Jenkins, Wilson, Taylor & Hunt, P.A.

(57) ABSTRACT

A device to fasten a system to a structure of a vehicle includes a drive unit that provides rotary movement of a drive element relative to the structure. The device has first and second supporting elements. The first supporting element is rotatably coupled to the drive element via a first rotation axis, and is rotatably mounted to the structure via a second rotation axis. The second supporting element is rotatably coupled to the first supporting element, and a first connecting element, which is rotatably mounted to the structure via a third rotation axis. The first connecting element is rotatably coupled to the second supporting element via a fourth rotation axis. The second supporting element is rotatably coupled to the first supporting element via a fifth rotation axis. During movement, the first supporting element has a different rotational speed than the second supporting element.

13 Claims, 5 Drawing Sheets

(56) References Cited

U.S. PATENT DOCUMENTS

| | | |
|---|---|---|
| 2016/0009372 A1* | 1/2016 | Grip .................... B64C 9/24 244/214 |
| 2016/0047246 A1 | 2/2016 | Wolcken |
| 2019/0084666 A1 | 3/2019 | Bentivoglio et al. |

FOREIGN PATENT DOCUMENTS

| | | |
|---|---|---|
| EP | 0103038 A1 | 3/1984 |
| EP | 1398269 A1 | 3/2004 |
| EP | 2147856 A1 | 1/2010 |
| EP | 2886451 A1 | 6/2015 |
| EP | 3 643 601 A1 | 4/2020 |
| GB | 1 496 519 A | 12/1977 |
| JP | 2020066423 A | 4/2020 |

* cited by examiner

DEVICE AND METHOD FOR MOVABLY FASTENING A VEHICLE SYSTEM TO A PRIMARY STRUCTURE OF A VEHICLE

CROSS-REFERENCE TO PRIORITY APPLICATION

This application claims the benefit of, and priority to, German patent application number DE 10 2018 126 561.1, filed Oct. 24, 2018. The content of the referenced application is incorporated by reference herein.

TECHNICAL FIELD

Embodiments of the subject matter described herein relate generally to the present disclosure relates to the fastening of vehicle systems to primary structure elements of a vehicle. In particular, the disclosure relates to a device for movably fastening a vehicle system to a primary structure of a vehicle, and to the use of such a device for fastening a trailing-edge flap system of an airfoil of an aircraft to a primary structure of the aircraft. Furthermore, the disclosure relates to a method for movably fastening a vehicle system to a primary structure of a vehicle.

BACKGROUND

Various techniques for fastening a vehicle component, for example a control component, to a vehicle or a primary structure of the vehicle are known nowadays. Use is made here in particular of mechanical systems which, however, frequently need a large amount of space and are therefore unsuitable for many application purposes or lead to disadvantages, such as, for example, increased drag or increased weight. This has an impact in particular in areas of application, such as automotive engineering, aerospace engineering or marine engineering, in which fluidically favorable arrangements of components, small overall sizes and a low weight are of great importance.

Patent publication US 2016/0047246 A1 discloses a morphing trailing-edge device for a flow profile, with a skin element, an actuator and a torsion element. The skin element is configured in such a manner that it extends on a surface of a trailing-edge region of the flow profile and comprises a load introduction point within a reinforced region. The skin element furthermore comprises a stiffening element, which is arranged substantially perpendicular to the load introduction point, wherein the load introduction point, the reinforced region and the stiffening element are integrated in the skin element.

Patent publication EP 2 886 451 A1 discloses a trailing-edge flap system for a wing of an aircraft, wherein the wing has a wing structure, wherein the trailing-edge flap system has a trailing-edge flap, a guide rail, a support and a drive device. The drive device is designed for moving the trailing-edge flap relative to the wing structure.

BRIEF SUMMARY

It is an object of the present disclosure to improve the adaptability of a vehicle system to various vehicle states.

This object is achieved by the subject matter of the independent claims. Exemplary embodiments emerge from the dependent claims and the description below.

According to one aspect of the disclosure, a device is specified for movably fastening a vehicle system to a primary structure of a vehicle. The device has a drive unit, which is designed to provide a rotatory movement of a drive element with respect to the primary structure. Furthermore, the device has a first supporting element, which is coupled to the drive element in a rotatory manner via a first rotation axis. The first supporting element is mounted in a rotatory manner with respect to the primary structure of the vehicle via a second rotation axis. The device furthermore has a second supporting element, which is coupled to the first supporting element in a rotatory manner, and a first connecting element, which is mounted in a rotatory manner with respect to the primary structure of the vehicle via a third rotation axis. The first connecting element is coupled here to the second supporting element in a rotatory manner via a fourth rotation axis. The second supporting element is coupled to the first supporting element in a rotatory manner via a fifth rotation axis, which is spaced apart from the fourth rotation axis, and therefore, during a movement of the first supporting element about the second rotation axis, the first supporting element is movable with a rotational speed which differs from a rotational speed of the second supporting element.

In other words, the device provides a kinematic system, in which a controlled rotation movement arises by a positive action of the forces between two fixed and two movable axes. In this case, the first supporting element is driven by the drive unit, wherein the first supporting element is mounted rotatably about an axis, that is to say rotatably about the second rotation axis, which is fixedly positioned in space, for example is fixedly anchored in the primary structure of the vehicle. The connecting element is likewise mounted rotatably at a first end about an axis, that is to say rotatably about the third rotation axis, which is fixedly positioned in space, for example is fixedly anchored in the primary structure of the vehicle. The third rotation axis can have a defined distance from the second rotation axis, i.e. the axis of the first supporting element. The connecting element is mounted rotatably at a second end about an axis, that is to say the fourth rotation axis, which is fixedly positioned in the second supporting element and has a defined distance from the fifth rotation axis, which defines the rotatable coupling of the first supporting element to the second supporting element. The second supporting element is therefore virtually mounted on the first supporting element so as to be rotatable about the fifth rotation axis, which is fixedly positioned with respect to the first supporting element.

If the first supporting element is now driven in a rotatory manner, the first supporting element rotates about its axis in space, that is to say about the primary structure. As a result, a defined rotation of the second supporting element also arises, said rotation being directly dependent on the geometry of the constructed elements, the arrangements of the axes of rotation and the positions and the length of the connecting element. This system can be extended as desired. An exemplary device will be explained more precisely in the description of the figures.

With the disclosed device, it is possible to provide a movable fastening of a vehicle system to a primary structure of a vehicle, with an extremely low overall height. When such a device is used for movably fastening a flap system to the primary structure of the vehicle, for example a trailing-edge flap system to an airfoil of an aircraft, a different deflection behavior can be achieved on both sides, i.e. in two directions, and the aerodynamic boundary layer can be optimized. Furthermore, the scalability in the number of segments, the drive trains and dimensions, such as height, width and length, has a positive effect on the adaptability to different vehicle configurations. For example, gaps between the movable parts of the vehicle system can be adapted depending on requirements, and a more flexible paneling is made possible since the number of deflecting segments can be increased.

The device for movably fastening a vehicle system to a primary structure of a vehicle can be a device for movably fastening a flap system to a primary structure of the vehicle. The flap system here can be a flow-influencing component, that is to say a tail unit or a rudder of the vehicle. For example, the flap system is a rudder of a watercraft, a rudder or elevator of an aircraft or a rudder unit or an elevator unit of an aircraft. However, the flap system may also be the flap system of a road vehicle, for example in the form of a movable spoiler, etc.

The drive unit can be a motor, for example an electric motor, a servomotor or an internal combustion engine. The drive unit can be arranged fixedly in the primary structure of the vehicle or can be mounted in a rotary manner with respect to the primary structure. At any rate, a rotary movement of a drive element, for example a drive linkage or a drive rod, with respect to the primary structure can be provided by the drive unit. The drive rod can be anchored fixedly at a first end in the primary structure and can execute a rotatory movement about a rotation axis fixedly anchored in the primary structure.

Furthermore, the device has the first supporting element, which can have an elongate shape and can extend along a longitudinal axis of the first supporting element. At a first end of the first supporting element, the first supporting element can be mounted movably about the second rotation axis, which can be arranged fixedly in the primary structure. At a second end of the first supporting element, the first supporting element can be coupled to the second supporting element in a rotary manner by means of the fifth rotation axis.

The first supporting element is furthermore coupled in a rotatory manner to the drive element or the drive rod by means of the first rotation axis. The first rotation axis is in particular not anchored fixedly in the primary structure, but rather is arranged rotatably about the second rotation axis, which is anchored fixedly in the primary structure and via which, in turn, the first supporting element is mounted in a rotatory manner with respect to the primary structure of the vehicle.

The device furthermore has the second supporting element, which can have an elongate shape and can extend along a longitudinal axis of the second supporting element. At a first end of the second supporting element, the second supporting element is mounted movably about the fifth rotation axis, which can be arranged fixedly in the first supporting element. At a second end of the second supporting element, the second supporting element can be coupled to a third supporting element in a rotary manner by means of an eighth rotation axis.

The first connecting element can likewise have an elongate shape and can extend along a longitudinal axis of the connecting element. At a first end of the connecting element, the connecting element is mounted in a rotatory manner with respect to the primary structure of the vehicle via the third rotation axis, wherein the third rotation axis is arranged in particular fixedly in the primary structure. The first connecting element is coupled at a second end of the connecting element to the second supporting element in a rotatory manner via the fourth rotation axis. The fourth rotation axis can in turn be arranged fixedly in the second supporting element, but can be movable rotatably in relation to the first supporting element about the fifth rotation axis.

The second supporting element is now coupled to the first supporting element in a rotatory manner via the fifth rotation axis in such a manner that, during a movement of the first supporting element about the second rotation axis, the first supporting element is movable with a rotational speed which differs from a rotational speed of the second supporting element.

The movement, that is to say rotation, of the first supporting element can be triggered here by the drive unit via the drive element. The effect which can be achieved as a result of the different rotational speeds of the first and second supporting element is that, during a movement of the first supporting element, a deflection angle between the longitudinal axis of the second supporting element and a longitudinal axis of the primary structure is always greater than a deflection angle between the longitudinal axis of the first supporting element and the longitudinal axis of the primary structure. In other words, this means that a rotational movement of the second supporting element in relation to the primary structure is always greater than a rotational movement of the first supporting element in relation to the primary structure. This can be continued as desired, and therefore, for example, a rotation movement of a third supporting element in relation to the primary structure is always greater than the rotational movement of the second supporting element in relation to the primary structure and is also greater than the rotational movement of the first supporting element in relation to the primary structure. This relationship will be clarified further in the description of the figures.

The supporting elements and the connecting elements, but also the drive element can be formed from a rigid or a flexible material. Furthermore, materials, such as aluminum, steel, plastic, carbon-fiber-reinforced plastic, glass-fiber-reinforced plastic or a combination of said materials can be used for these components of the device.

According to one embodiment of the invention, the vehicle system is an aircraft system, which has a trailing-edge flap system of an airfoil of an aircraft.

The device brings about a different deflection of the individual supporting elements with respect to one another, said deflection being specifically coordinated to the respective application. Furthermore, a different deflection behavior of flap segments of the rear-edge flap system on both sides, i.e. in two directions, can be achieved, and the aerodynamic boundary layer can be optimized.

According to one embodiment of the invention, the device furthermore has a first trailing-edge flap segment, which is fixed or fastened to the first supporting element and is movable together with the first supporting element. Alternatively or additionally, the device has a second trailing-edge flap segment, which is fixed or fastened to the second supporting element and is movable together with the second supporting element.

It should be noted that the individual segments can each also be an integral part of the supporting elements. The trailing-edge flap segments can be designed as planar segments, in particular in the form of aerodynamic surface segments. The disclosed device makes it possible to provide any desired number of such segments, wherein height, width and length can be adapted to different vehicle configurations. The individual segments can also be flexible, and therefore an alignment of the trailing-edge flap segments is adjustable by what is referred to as "morphing". Furthermore, the device makes it possible for gaps between the movable parts of the vehicle system to be adapted, according to requirements, and a more flexible paneling is made possible by the number of deflecting segments being increased. It can be provided that the individual trailing-edge flap segments are deflected or rotated together with their associated supporting elements.

According to one embodiment of the invention, the drive unit has a piston engine, which is designed to bring about the rotatory movement of the drive element with respect to the primary structure.

The piston engine can trigger a translatory movement of the drive element, that is to say the drive rod, by means of a piston movement, which, in turn, because of the rotatory mounting of the drive element in the primary structure and the rotatory coupling to the first supporting element, leads to a rotatory movement of the drive element itself.

According to one embodiment of the invention, the connecting element has a first actuator, which is designed to change the length of the first connecting element in order thus to adapt the rotational speed of the first supporting element with respect to the rotational speed of the second supporting element.

This means that the rotation or rotational speed of the second supporting element cannot be determined solely by the arrangement and geometry of the individual components of the device, but rather active influencing, for example by changing the lengths of the first and/or second connecting element or else by changing the lengths of the first and/or second supporting element, can take place. In particular, the first actuator can adjust the length of the first connecting element. A length-changing speed of the first connecting element can also be adjusted by the first actuator. As a result, the rotational speed of the first supporting element can be precisely varied, adjusted and adapted in relation to the rotational speed of the second supporting element by means of a further adjustment parameter. Similarly, the first and second supporting element can also both have actuators which can precisely vary, adjust and adapt the lengths, in particular the length-changing speeds, of the supporting elements.

According to one embodiment of the invention, the device has a third supporting element, which is coupled in a rotatory manner to the second supporting element. Furthermore, the device has a second connecting element, which is mounted in a rotatory manner with respect to the first supporting element via a sixth rotation axis. The second connecting element is coupled in a rotatory manner to the third supporting element via a seventh rotation axis. The third supporting element is coupled in a rotatory manner to the second supporting element via an eighth rotation axis, which is spaced apart from the seventh rotation axis, and therefore, during a movement of the second supporting element about the fifth rotation axis, the second supporting element is movable with a rotational speed which differs from a rotational speed of the third supporting element.

The device can therefore be proceeded with any number of supporting elements, wherein the arrangement of the further elements in a structural respect always takes place as for the coupling between the second and the third supporting element.

According to one embodiment of the invention, the device has a third trailing-edge flap segment, which is fixed or fastened to the third supporting element and is movable together with the third supporting element.

In particular, any number of trailing-edge flap segments which are connected to the supporting elements can be provided, which further increases the flexibility and adaptability of the trailing-edge flap system.

According to one embodiment of the invention, the first supporting element has a first longitudinal extent direction, along which the second rotation axis is spaced apart from the fifth rotation axis. Alternatively or additionally, the second supporting element has a second longitudinal extent direction, along which the fifth rotation axis is spaced apart from the eighth rotation axis.

By means of the different rotational speed of the first supporting element and the second supporting element, the angle between the first longitudinal extent direction and the second longitudinal extent direction and therefore also between the first and second trailing-edge flap segments fixed to the first and second supporting elements can be changed. The rotational speeds of the individual supporting elements can furthermore be influenced by respectively provided actuators which bring about a change in length of the supporting elements in the respective longitudinal extent directions.

According to one embodiment of the invention, the second connecting element has a second actuator, which is designed to change the length of the second connecting element in order thus to adapt the rotational speed of the second supporting element with respect to the rotational speed of the third supporting element.

This means that the rotation or rotational speed of the third supporting element cannot be determined solely by the arrangement and geometry of the individual components of the device, but rather active influencing can take place, for example, also by changing the length of the second connecting element. In particular, the second actuator can adjust the length of the second connecting element. A length-changing speed can also be adjusted here by the second actuator. As a result, the rotational speed of the third supporting element can be precisely varied, adjusted and adapted in relation to the rotational speed of the first and second supporting element by means of a further adjustment parameter.

According to one aspect of the disclosure, the use of the device, described previously and below, for fastening a trailing-edge flap system of an airfoil of an aircraft to a primary structure of the aircraft is indicated.

According to a further aspect of the disclosure, a method is indicated for movably fastening a vehicle system to a primary structure of a vehicle. In one step of the method, a rotatory fastening of a drive element with respect to the primary structure of the vehicle is provided. In a further step, a first supporting element is coupled in a rotatory manner to the drive element via a first rotation axis. In a further step, the first supporting element is mounted in a rotatory manner with respect to the primary structure of the vehicle via a second rotation axis. In a further step, a second supporting element is coupled in a rotatory manner to the first supporting element and, in a further step, a first connecting element is mounted in a rotatory manner with respect to the primary structure of the vehicle via a third rotation axis. In a further step, the first connecting element is coupled in a rotatory manner to the second supporting element via a fourth rotation axis. In a further step, the second supporting element is coupled in a rotatory manner to the first supporting element via a fifth rotation axis, which is spaced apart from the fourth rotation axis, and therefore, during a movement of the first supporting element about the second rotation axis, the first supporting element is movable with a rotational speed which differs from a rotational speed of the second supporting element.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The illustrations in the figures are schematic and not to scale.

If the same reference signs are used in various figures in the description below of the figures, they denote identical or similar elements. However, identical or similar elements may also be denoted by different reference signs.

Figure 1:
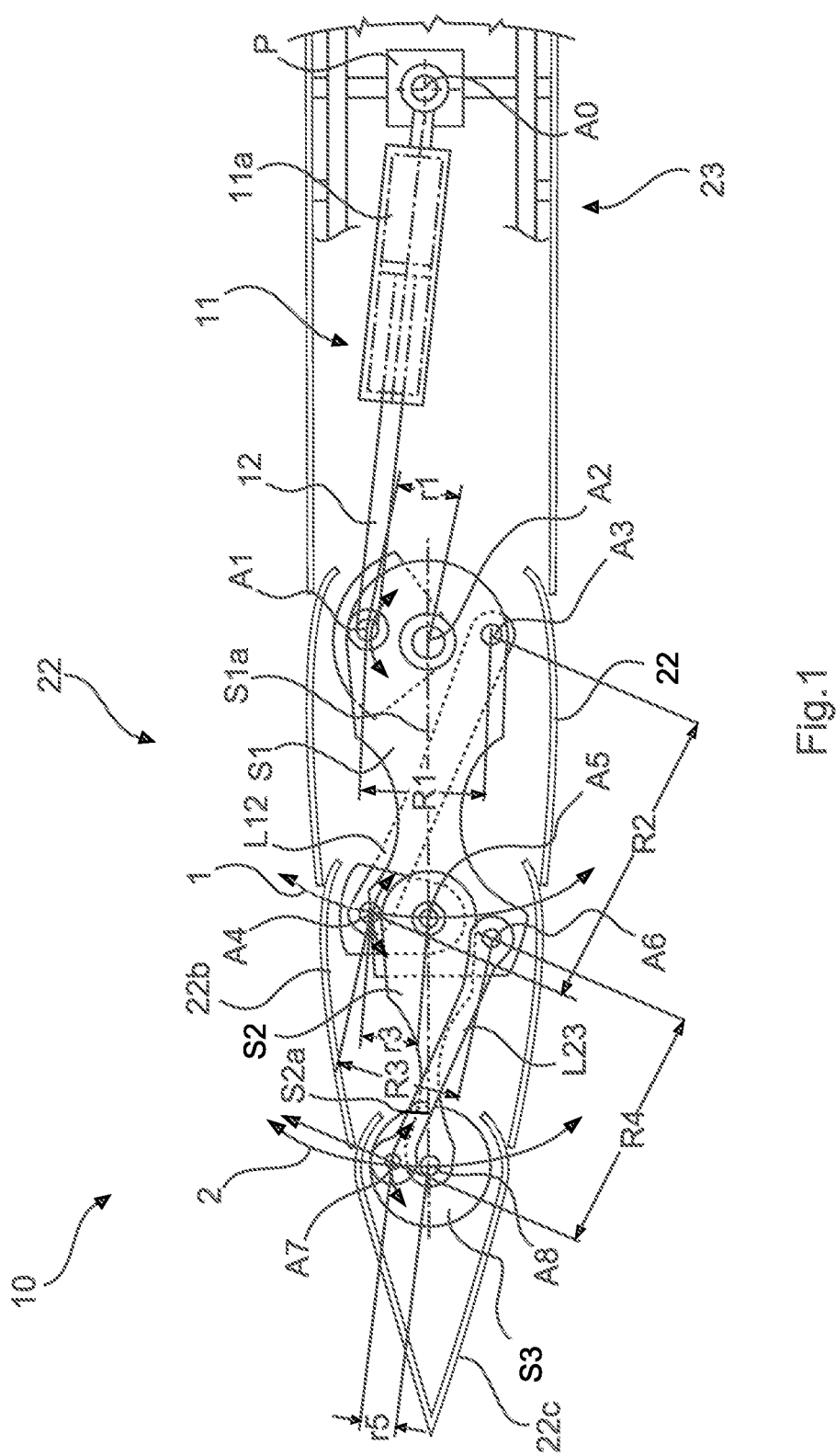
FIG. 1 shows a side view of a device for movably fastening a trailing-edge flap system to a primary structure of an aircraft according to an exemplary embodiment of the invention.

FIG. 1 shows a side view of a device 10 for movably fastening a trailing-edge flap system 22 to a primary structure P of an aircraft. The device 10 has a drive unit 11, which is designed to provide a rotatory movement of a drive element 12 with respect to the primary structure P. The device 10 furthermore has a first supporting element S1, which is coupled in a rotatory manner to the drive element 12 via a first rotation axis A1. The first supporting element S1 is mounted in a rotatory manner with respect to the primary structure P of the aircraft via a second rotation axis A2. The device 10 furthermore has a second supporting element S2, which is coupled in a rotatory manner to the first supporting element S1, and a first connecting element L12, which is mounted in a rotatory manner with respect to the primary structure P via a third rotation axis A3. The first connecting element L12 is illustrated partially concealed in FIG. 1, wherein the concealed parts of the connecting element L12 are illustrated by dashed lines. In general, concealed parts in the figures can be illustrated by dashed lines. The first connecting element L12 is coupled in a rotatory manner to the second supporting element S2 via a fourth rotation axis A4. The second supporting element S2 is coupled in a rotatory manner to the first supporting element S1 via a fifth rotation axis A5, which is spaced apart from the fourth rotation axis A4, and therefore, during a movement of the first supporting element S1 about the second rotation axis A2, the first supporting element S1 is movable with a rotational speed which differs from a rotational speed of the second supporting element S2.

The device 10 furthermore has a third supporting element S3, which is coupled in a rotatory manner to the second supporting element S2, and a second connecting element L23, which is mounted in a rotatory manner with respect to the first supporting element S1 via a sixth rotation axis A6. The second connecting element L23 is coupled in a rotatory manner to the third supporting element S3 via a seventh rotation axis A7. The third supporting element S3 is coupled in a rotatory manner to the second supporting element S2 via an eighth rotation axis A8, which is spaced apart from the seventh rotation axis A7, and therefore, during a movement of the second supporting element S2 about the fifth rotation axis A5, the second supporting element S2 is movable with a rotational speed which differs from a rotational speed of the third supporting element S3.

The drive unit 11, which has a piston engine 11a in the configuration illustrated in FIG. 1, is mounted in a rotatory manner with respect to the primary structure P of the vehicle. The primary structure P can be formed by reinforcing elements, such as beam elements, ribs, stringers, frames and cladding or outer skin elements of the aircraft. In the case illustrated in FIG. 1, the primary structure P is formed by an airfoil structure or an airfoil 23 of the aircraft. The drive unit 11 provides a rotatory movement of a drive element 12, in particular a drive rod, with respect to the primary structure P. The drive element 12 is anchored here at a first end fixedly in the primary structure P via a suspension point and executes a rotatory movement about a rotation axis A0 anchored fixedly in the primary structure P.

Furthermore, the device 10 has the first supporting element S1, which extends along a longitudinal axis S1a of the first supporting element S1. At a first end of the first supporting element S1, the first supporting element S1 is mounted movably about the second rotation axis A2, wherein the second rotation axis A2 is fixedly anchored in the primary structure P, even though this may not be illustrated in FIG. 1. At a second end of the first supporting element S1, the first supporting element is coupled in a rotatory manner to the second supporting element S2 by means of the fifth rotation axis A5.

The first supporting element S1 is furthermore coupled in a rotatory manner to the drive element 12 or the drive rod by means of the first rotation axis A1. The first rotation axis A1 is not fixedly anchored here in the primary structure P, but rather is arranged rotatably about the second rotation axis A2 which, in turn, is fixedly anchored in the primary structure P. The first supporting element S1 is therefore mounted in a rotatory manner with respect to the primary structure P about the second rotation axis A2. The first rotation axis A1 is spaced apart from the second rotation axis A2 by the constant distance r1. The first rotation axis A1 is spaced apart from the third rotation axis A3 by the variable distance R1.

The second supporting element S2 extends along a longitudinal axis S2a of the second supporting element S2. At a first end of the second supporting element S2, the second supporting element S2 is mounted movably about the fifth rotation axis A5, which is arranged fixedly in the first supporting element S1. At a second end of the second supporting element S2, the second supporting element S2 is coupled in a rotatory manner to the third supporting element S3 via the eighth rotation axis A8.

At a first end of the first connecting element L12, the first connecting element L12 is mounted in a rotatory manner with respect to the primary structure P of the vehicle via the third rotation axis A3, wherein the third rotation axis A3 is arranged in particular fixedly in the primary structure P. The first connecting element L12 is coupled at a second end of the first connecting element L12 in a rotatory manner to the second supporting element S2 via the fourth rotation axis A4. The fourth rotation axis A4 is arranged fixedly in turn in the second supporting element S2, but the fourth rotation axis A4 is arranged rotatably in relation to the first supporting element S1 about the fifth rotation axis A5. The fourth rotation axis A4 is spaced apart from the fifth rotation axis A5 by the constant distance r3. The fourth rotation axis A4 is spaced apart in relation to the sixth rotation axis A6 by the variable distance R3. The first connecting element L12 spaces apart the third rotation axis A3 from the fourth rotation axis A4 by the distance R2, wherein the distance R2 can be adjustable by means of a first actuator, not illustrated.

The second supporting element S2 is now coupled in a rotatory manner to the first supporting element S1 via the fifth rotation axis A5 in such a manner that, during a movement of the first supporting element S1 about the second rotation axis A2 (direction of rotation is illustrated by arrows in FIG. 1), the first supporting element S1 is movable with a rotational speed which differs from a rotational speed of the second supporting element S2. The rotation directions of the second supporting element S2 about the fifth rotation axis A5 and the rotation directions of the third supporting element S3 about the eighth rotation axis A8 are likewise indicated in FIG. 1 by corresponding arrows. Furthermore, the movement or rotation directions of the fifth rotation axis A5 during rotation of the first supporting element S1 about the second rotation axis A2 are illustrated by means of the arrows 1. Furthermore, the movement or rotation directions of the eighth rotation axis A8 during a rotation of the second supporting element S2 about the fifth rotation axis A5 are illustrated by means of the arrows 2.

At a first end of the second connecting element L23, the second connecting element L23 is mounted in a rotatory manner with respect to the first supporting element S1 via the sixth rotation axis A6, wherein the sixth rotation axis A6 is arranged fixedly in the first supporting element S1. The second connecting element L23 is coupled at a second end of the second connecting element L23 in a rotatory manner to the third supporting element S3 via the seventh rotation axis A7. The seventh rotation axis A7 is arranged fixedly in turn in the third supporting element S3, but the seventh rotation axis A7 is arranged rotatably in relation to the second supporting element S2 about the eighth rotation axis A8. The seventh rotation axis A7 is spaced apart from the eighth rotation axis A8 by the constant distance r5. The second connecting element L23 spaces apart the sixth rotation axis A6 from the seventh rotation axis A7 by the distance R4, wherein the distance R4 can be adjustable by means of a second actuator, not illustrated.

In the case illustrated in FIG. 1, the third supporting element S3 is the final link in the kinematic chain. However, it should be understood that the principle of said kinematic chain can be continued with any number of supporting elements and connecting elements.

The individual rotational speeds of the supporting elements S1, S2 and S3 can be adjusted in a targeted manner by joint or selected adjustment of the distances r1, r3, r5, R1, R2, R3 and R5, and therefore the trailing-edge flap segments 22a, 22b, 22c which are fixed on the supporting elements S1, S2, S3 and have rotational speeds coordinated in a targeted manner can be moved relative to one another.

Figure 2:
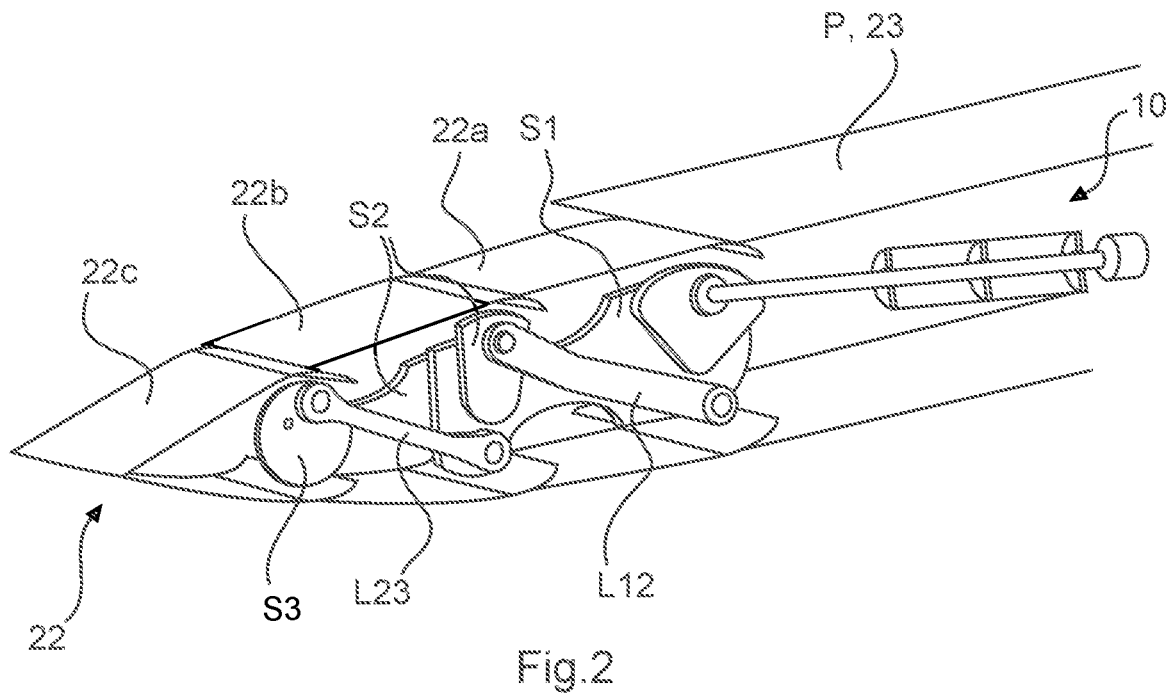
FIG. 2 shows a perspective view of a device for movably fastening a trailing-edge flap system to a primary structure of an aircraft according to an exemplary embodiment of the invention.

FIG. 2 shows a perspective view of the device 10 for movably fastening a trailing-edge flap system 22 to a primary structure P, which is formed by a wing structure or an airfoil 23 of the aircraft 24. The device 10 illustrated in FIG. 1 is provided here with the first supporting element S1, the second supporting element S2, which is fastened rotatably to the first supporting element S1, and the third supporting element S3, which is fastened rotatably to the second supporting element S2, wherein only the first supporting element S1 of the supporting elements S1, S2, S3 is fastened to the primary structure P. The first supporting element S1 has a first trailing-edge flap segment 22a fastened thereto. The second supporting element S2 has a second trailing-edge flap segment 22b fastened thereto. The third supporting element S3 has a third trailing-edge flap segment 22c fastened thereto. FIG. 2 also shows the connecting elements L12, L23.

Figure 3:
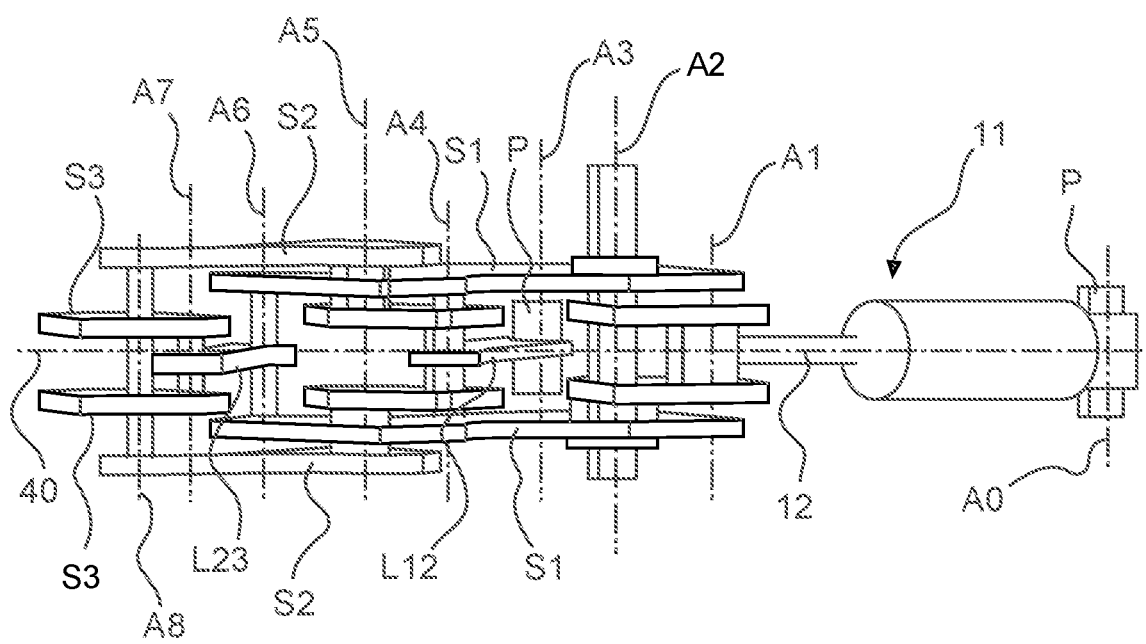
FIG. 3 shows a perspective view of a device for movably fastening a vehicle system to a primary structure according to an exemplary embodiment of the invention.

FIG. 3 shows a perspective view of the device 10 from FIGS. 1 and 2 for movably fastening a vehicle system 20, not illustrated, to a primary structure P. All of the rotation axes A0, A1, A2, A3, A4, A5, A6, A7, A8 and also all of the supporting elements S1, S2, S3 are illustrated once again here. Furthermore, the first connecting element L12 and the second connecting element L23 are also illustrated. It is possible to see the symmetrical configuration of the device, in which the first supporting element S1, the second supporting element S2 and the third supporting element S3 are each formed by two partial supporting elements which lie opposite one another with respect to a plane of symmetry passing continuously through the line of symmetry 40. The manner of operation corresponds to the manner of operation already described with respect to FIG. 1.

Figure 4A:
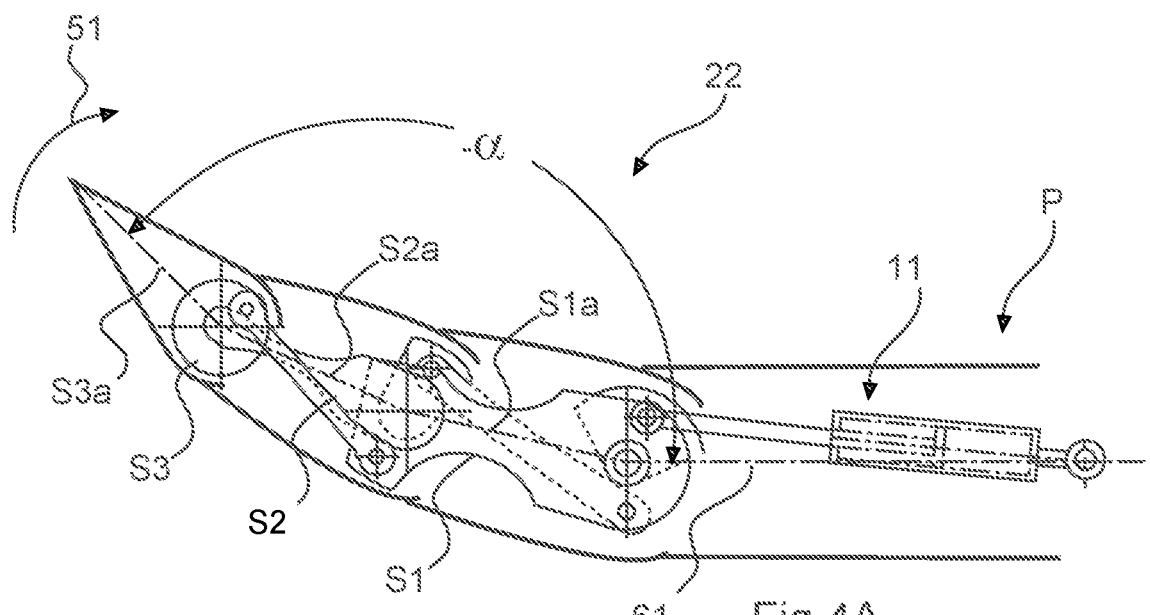
FIG. 4A shows a side view of the device, which is illustrated in FIGS. 1 and 2, in a state of the trailing-edge flap system deflected in a first direction, according to an exemplary embodiment of the invention.

FIG. 4A shows a side view of the device 10, which is illustrated in FIGS. 1 and 2, in a state of the trailing-edge flap system 22 that is deflected in a first direction 51 and in which the relative rotation of the respective supporting elements S1, S2, S3 with respect to one another takes place in such a manner that a deflecting angle $-\square$ between a longitudinal extent direction 61 of the primary structure element P and a longitudinal extent direction S3a of the third supporting element S3 is set. The longitudinal extent directions S1a and S2a of the first supporting element S1 and of the second supporting element S2, respectively, are likewise illustrated.

Figure 4B:
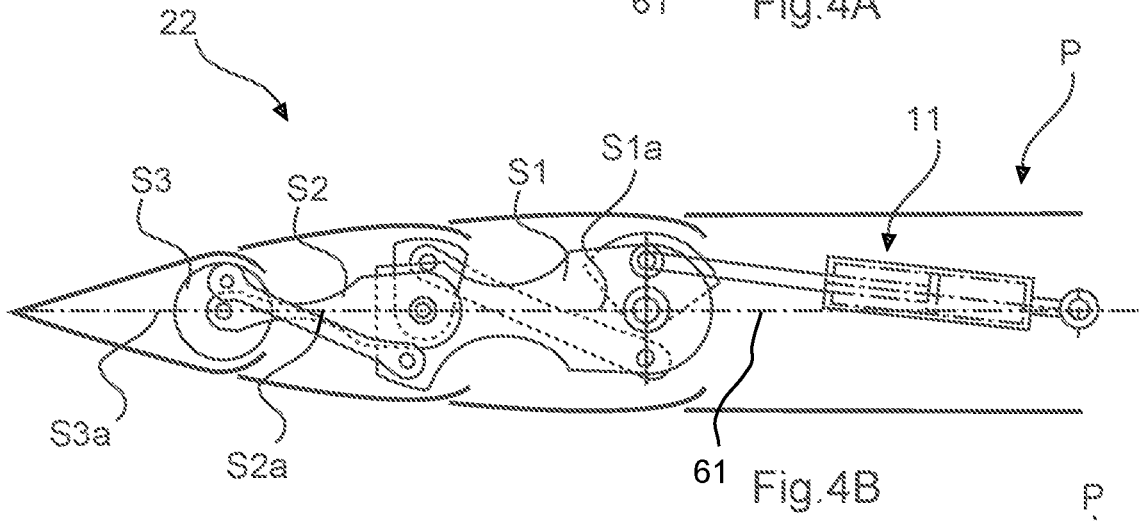
FIG. 4B shows a side view of the device, which is illustrated in FIGS. 1 and 2, in an undeflected state of the trailing-edge flap system according to an exemplary embodiment of the invention.

FIG. 4B shows a side view of the device 10, which is illustrated in FIGS. 1 and 2, in an undeflected state of the trailing-edge flap system 22, in which the longitudinal extent direction 61 of the primary structure element P, the longitudinal extent direction S1a of the first supporting element S1, the longitudinal extent direction S2a of the second supporting element S2 and the longitudinal extent direction S3a of the third supporting element S3 are oriented parallel to one another, in particular lie on a line.

Figure 4C:
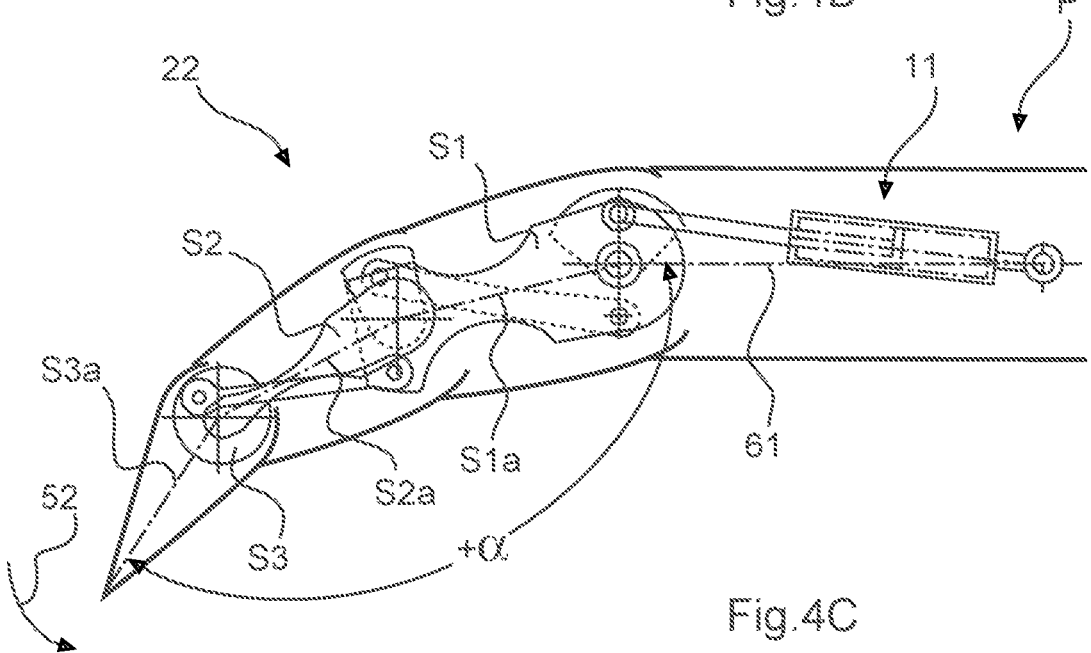
FIG. 4C shows a side view of the device, which is illustrated in FIGS. 1 and 2, in a state of the trailing-edge flap system deflected in a second direction, according to an exemplary embodiment of the invention.

FIG. 4C shows a side view of the device 10, which is illustrated in FIGS. 1 and 2, in a state of the trailing-edge flap system 22 that is deflected in a second direction 52 and in which the relative rotation of the respective supporting elements S1, S2, S3 with respect to one another takes place in such a manner that a deflecting angle +□ between a longitudinal extent direction 61 of the primary structure element P and a longitudinal extent direction S3a of the third supporting element S3 is set. The longitudinal extent directions S1a and S2a of the first supporting element S1 and of the second supporting element S2, respectively, are likewise illustrated.

As is apparent from FIG. 4C, the effect achieved as a result of the different rotational speeds of the first supporting element S1 and of the second supporting element S2 that are brought about by the kinematic chain is that, during a movement of the first supporting element S1, a deflection angle between the longitudinal axis S2a of the second supporting element S2 and a longitudinal axis 61 of the primary structure P is always greater than a deflection angle between the longitudinal axis S1a of the first supporting element S1 and the longitudinal axis 61 of the primary structure P.

Figure 5:
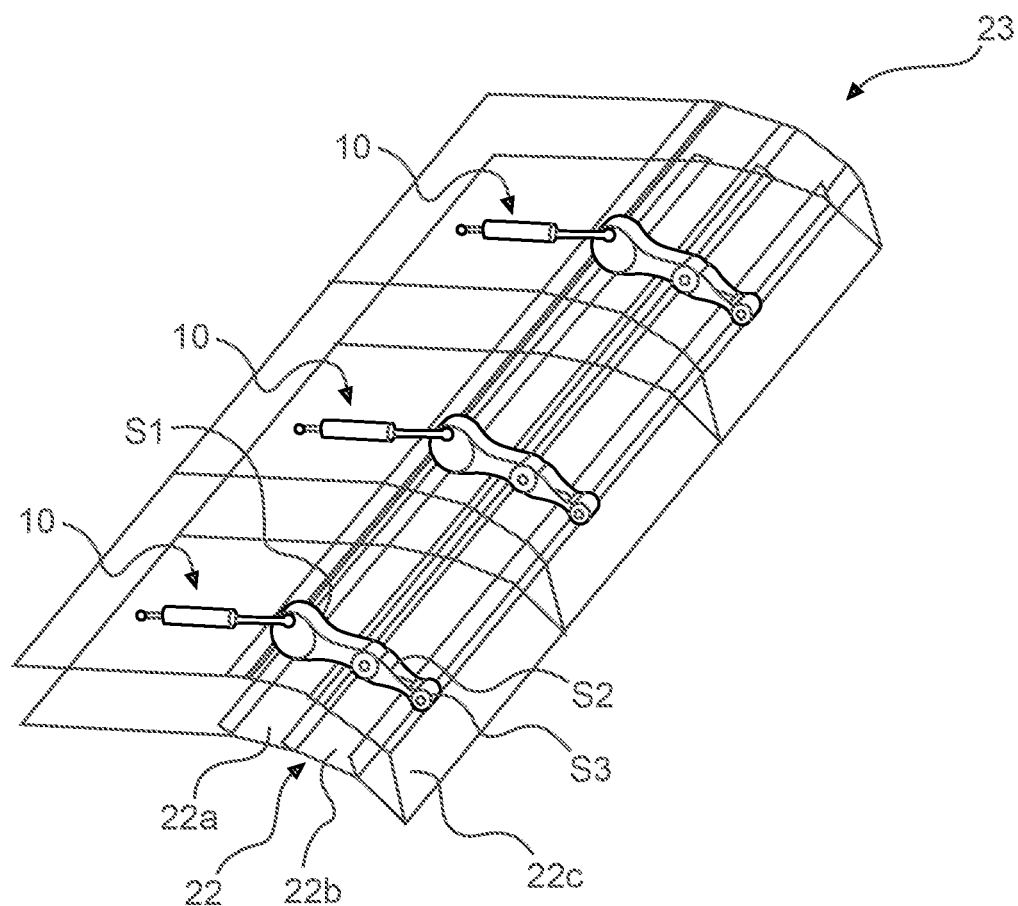
FIG. 5 shows a perspective view of a detail from an airfoil of an aircraft with three devices for movably fastening a trailing-edge flap system to the airfoil according to an exemplary embodiment of the invention.

FIG. 5 shows a perspective view of a detail from an airfoil 23 of an aircraft, not illustrated, with three devices 10 for movably fastening a trailing-edge flap system 22 to the airfoil 23. It can be seen that the individual trailing-edge flap segments 22a, 22b, 22c, which are fastened to the respective supporting elements S1, S2, S3, together form an aerodynamic overall surface which is used for influencing the flow on the airfoil 23.

Figure 6:
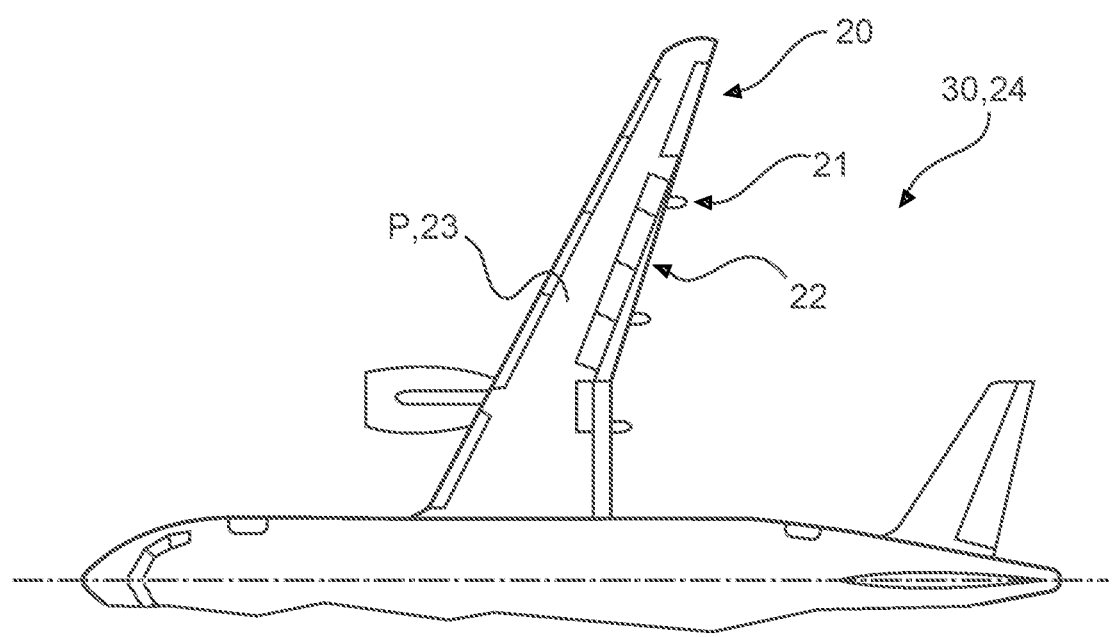
FIG. 6 shows an aircraft with a device for movably fastening a trailing-edge flap system to a primary structure of the aircraft according to an exemplary embodiment of the invention.

FIG. 6 shows a vehicle 30, in particular an aircraft 24, with a device 10 for movably fastening a vehicle system 20, in particular an aircraft system 21, in particular a trailing-edge flap system 22, to a primary structure P of the aircraft 24. The trailing-edge flap system 22 shown in FIG. 5 is fastened here to a trailing edge of the airfoil 23 of FIG. 6.

Figure 7:
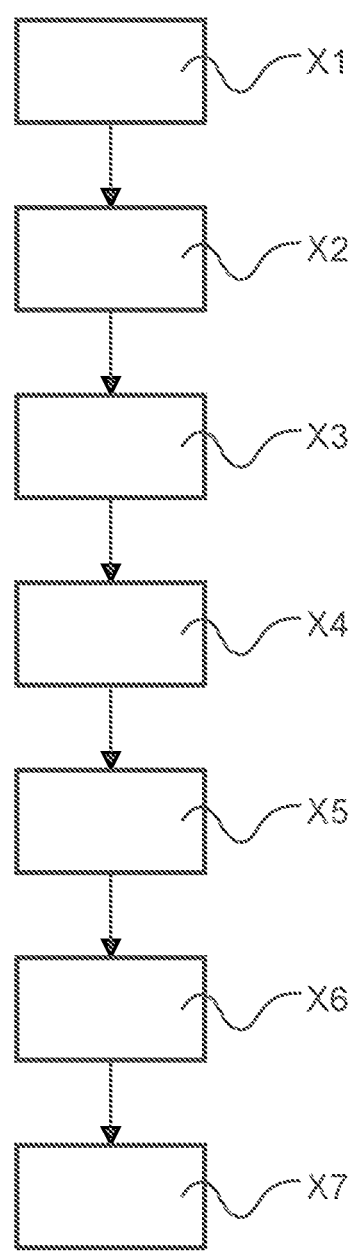
FIG. 7 shows a flow diagram of a method for movably fastening a vehicle system to a primary structure of a vehicle according to an exemplary embodiment of the invention.

FIG. 7 shows a flow diagram of a method for movably fastening a vehicle system 20 to a primary structure P of a vehicle 30. In a step X1 of the method, a rotatory fastening of a drive element 11 with respect to the primary structure P of the vehicle 30 is provided. In a further step X2, a first supporting element S1 is coupled in a rotatory manner to the drive element 11 via a first rotation axis A1. In a further step X3, the first supporting element S1 is mounted in a rotatory manner with respect to the primary structure P of the vehicle 30 via a second rotation axis A2. In a further step X4, a second supporting element S2 is coupled in a rotatory manner to the first supporting element S1 and, in a further step X5, a first connecting element L12 is mounted in a rotatory manner with respect to the primary structure P of the vehicle 30 via a third rotation axis A3. In a further step X6, the first connecting element L12 is coupled in a rotatory manner to the second supporting element S2 via a fourth rotation axis A4. In a further step X7, the second supporting element S2 is coupled in a rotatory manner to the first supporting element S1 via a fifth rotation axis A5, which is spaced apart from the fourth rotation axis A4, and therefore, during a movement of the first supporting element S1 about the second rotation axis A2, the first supporting element S1 is movable with a rotational speed which differs from a rotational speed for the second supporting element S2.

It should additionally be pointed out that "comprising" does not preclude other elements or steps, and "a" or "one" does not preclude a multiplicity. Furthermore, it should be pointed out that features or steps which have been described with reference to one of the exemplary embodiments above can also be used in combination with other features or steps of other exemplary embodiments described above. Reference signs in the claims are not intended to be regarded as restrictive.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A device for movably fastening a vehicle system to a primary structure of a vehicle, comprising:
   a drive unit to provide a rotatory movement of a drive element with respect to the primary structure;
   a first supporting element coupled in a rotary manner to the drive element via a first rotation axis;
   wherein the first supporting element is mounted in a rotary manner with respect to the primary structure of the vehicle via a second rotation axis;
   a second supporting element coupled in a rotary manner to the first supporting element;
   a first connecting element mounted in a rotary manner with respect to the primary structure of the vehicle via a third rotation axis;
   wherein the first connecting element is coupled in a rotary manner to the second supporting element via a fourth rotation axis;
   wherein the second supporting element is coupled in a rotary manner to the first supporting element via a fifth rotation axis, which is spaced apart from the fourth rotation axis such that during a movement of the first supporting element about the second rotation axis, the first supporting element is movable with a rotational speed which differs from a rotational speed of the second supporting element.

2. The device according to claim 1, wherein the vehicle system is an aircraft system, which has a trailing-edge flap system of an airfoil of an aircraft.

3. The device according to claim 1, further comprising:
   a first trailing-edge flap segment, which is fixed to the first supporting element and is movable together with the first supporting element; and
   a second trailing-edge flap segment, which is fixed to the second supporting element and is movable together with the second supporting element.

4. The device according to claim 1, wherein the drive unit has a piston engine to bring about the rotary movement of the drive element with respect to the primary structure.

5. The device according to claim 1, wherein the first connecting element has a first actuator to change the length of the first connecting element to adapt the rotational speed of the first supporting element with respect to the rotational speed of the second supporting element.

6. The device according to claim 1, further comprising:
a third supporting element coupled in a rotary manner to the second supporting element;
a second connecting element mounted in a rotary manner with respect to the first supporting element via a sixth rotation axis;
wherein the second connecting element is coupled in a rotary manner to the third supporting element via a seventh rotation axis;
wherein the third supporting element is coupled in a rotary manner to the second supporting element via an eighth rotation axis, which is spaced apart from the seventh rotation axis such that during a movement of the second supporting element about the fifth rotation axis, the second supporting element is movable with a rotational speed which differs from a rotational speed of the third supporting element.

7. The device according to claim 6, further comprising a third trailing-edge flap segment fixed to the third supporting element and movable together with the third supporting element.

8. The device according to claim 6, wherein the first supporting element has a first longitudinal extent direction, along which the second rotation axis is spaced apart from the fifth rotation axis.

9. The device according to claim 6, wherein the second supporting element has a second longitudinal extent direction, along which the fifth rotation axis is spaced apart from the eighth rotation axis.

10. The device according to claim 6, wherein:
the first supporting element has a first longitudinal extent direction, along which the second rotation axis is spaced apart from the fifth rotation axis; and
the second supporting element has a second longitudinal extent direction, along which the fifth rotation axis is spaced apart from the eighth rotation axis.

11. The device according to claim 6, wherein the second connecting element has a second actuator to change the length of the second connecting element to adapt the rotational speed of the second supporting element with respect to the rotational speed of the third supporting element.

12. Use of a device according to claim 1 for fastening a trailing-edge flap system of an airfoil of an aircraft to a primary structure of the aircraft.

13. A method for movably fastening a vehicle system to a primary structure of a vehicle, comprising the steps of:
providing a rotary fastening of a drive element with respect to the primary structure of the vehicle;
coupling a first supporting element to the drive element in a rotary manner via a first rotation axis;
mounting the first supporting element in a rotary manner with respect to the primary structure of the vehicle via a second rotation axis;
coupling a second supporting element to the first supporting element in a rotary manner;
mounting a first connecting element in a rotary manner with respect to the primary structure of the vehicle via a third rotation axis;
coupling the first connecting element to the second supporting element in a rotary manner via a fourth rotation axis;
coupling the second supporting element to the first supporting element in a rotary manner via a fifth rotation axis, which is spaced apart from the fourth rotation axis, such that during a movement of the first supporting element about the second rotation axis, the first supporting element is movable with a rotational speed which differs from a rotational speed of the second supporting element.

* * * * *